US011472543B2

(12) United States Patent
Brughera et al.

(10) Patent No.: US 11,472,543 B2
(45) Date of Patent: Oct. 18, 2022

(54) CONVERTIPLANE AND CONTROL METHOD THEREOF

(71) Applicant: LEONARDO S.P.A., Rome (IT)

(72) Inventors: Paolo Brughera, Samarate (IT); Paolo Sportelli, Samarate (IT); Pierre Abdel Nour, Samarate (IT); Andrea Bernascone, Samarate (IT); Cristian Lilliu, Samarate (IT)

(73) Assignee: LEONARDO S.P.A., Rome (IT)

( * ) Notice: Subject to any disclaimer, the term of this patent is extended or adjusted under 35 U.S.C. 154(b) by 280 days.

(21) Appl. No.: 16/769,142

(22) PCT Filed: Dec. 27, 2018

(86) PCT No.: PCT/IB2018/060654
§ 371 (c)(1),
(2) Date: Jun. 2, 2020

(87) PCT Pub. No.: WO2019/130238
PCT Pub. Date: Jul. 4, 2019

(65) Prior Publication Data
US 2021/0221496 A1    Jul. 22, 2021

(30) Foreign Application Priority Data
Dec. 27, 2017   (EP) ..................................... 17210646

(51) Int. Cl.
*B64C 27/58*   (2006.01)
*B64C 29/00*   (2006.01)
(52) U.S. Cl.
CPC .......... *B64C 27/58* (2013.01); *B64C 29/0033* (2013.01)

(58) Field of Classification Search
CPC ...... B64C 29/0033; B64C 27/52; B64C 27/58
See application file for complete search history.

(56) References Cited

U.S. PATENT DOCUMENTS 3,514,052 A * 5/1970 McKeown .......... B64C 29/0033
                                              416/102
4,168,045 A * 9/1979 Wright ................. G05D 1/0841
                                              244/221

(Continued)

FOREIGN PATENT DOCUMENTS

| EP | 1 232 943 | 8/2002 |
| EP | 2 105 379 | 9/2009 |
| WO | WO 2006/022654 | 3/2006 |

*Primary Examiner* — Richard R. Green
*Assistant Examiner* — William L Gmoser
(74) *Attorney, Agent, or Firm* — Leason Ellis LLP

(57) ABSTRACT

A convertiplane is described that has a fuselage with a first axis, a pair of half-wings, and a pair of rotors arranged on mutually opposite ends of the half-wings. The rotor comprises a mast hinged on a second axis and a plurality of blades hinged on the mast. The mast of the rotor can be tilted with the second axis about a third axis transversal to the second axis and with respect to the fuselage to transform the convertiplane between a helicopter mode and an aeroplane mode; the second axis is transversal to the first axis in the helicopter mode and is parallel to the first axis in the aeroplane mode. The rotor disc can be tilted about a fourth axis. The rotor comprises control means for controlling the cyclic pitch and collective pitch of the blades comprising: a first actuator controllable to vary the collective pitch, a second actuator controllable to vary the tilt of the rotor disc about the fourth axis and a rod movable to alter the tilt of the corresponding rotor disc about a fifth axis according to the mode of the convertiplane.

4 Claims, 6 Drawing Sheets

(56) References Cited

U.S. PATENT DOCUMENTS

| | | |
|---|---|---|
| 9,567,070 B2 | 2/2017 | Shundo et al. |
| 10,421,540 B1 * | 9/2019 | Koelzer .................. B64C 27/08 |
| 2007/0221780 A1 | 9/2007 | Builta |
| 2015/0274290 A1 * | 10/2015 | Fenny ..................... B64C 27/32 |
| | | 244/17.25 |
| 2019/0023388 A1 * | 1/2019 | Roberts .................. B64C 27/28 |

* cited by examiner

US 11,472,543 B2

CONVERTIPLANE AND CONTROL METHOD THEREOF

CROSS-REFERENCE TO RELATED APPLICATIONS

This patent application is a U.S. National Phase Application under 35 U.S.C. § 371 of International Patent Application No. PCT/IB2018/060654, filed on Dec. 27, 2018, which claims priority from European patent application no. 17210646.0 filed on Dec. 27, 2017, all of which are incorporated by reference, as if expressly set forth in their respective entireties herein.

TECHNICAL FIELD

The present invention relates to a convertiplane and to an associated control method.

BACKGROUND ART

As is known, convertiplanes are hybrid aircrafts with tilting rotors.

In greater detail, convertiplanes are capable of selectively assuming an "aeroplane" configuration where the rotors are arranged with respective first axes substantially parallel to a second longitudinal axis of the convertiplane, or a "helicopter" configuration where the rotors are arranged with the respective first axes substantially vertical and transversal to the aforementioned second longitudinal axis of the convertiplane.

Due to the possibility of tilting the rotors, convertiplanes can take off and land like a helicopter, i.e. without the need of a runway and even on rough ground, and without generating a noise level incompatible with an urban settlement.

In addition, convertiplanes can hover when arranged in the helicopter configuration.

Convertiplanes can also reach and maintain cruising speeds of approximately 500 km/h and flying altitudes of around 7500 metres, when arranged in the aeroplane configuration.

This cruising speed is much higher than the value of approximately 300 km/h defining the maximum cruising speed of helicopters.

Similarly, the aforementioned altitude is much higher than that typical of helicopters and allows convertiplanes in aeroplane mode to avoid the clouds and atmospheric disturbances characteristic of lower altitudes.

Known types of convertiplane basically comprise:
a fuselage;
a pair of half-wings arranged in a cantilever fashion on respective mutually opposite sides of the fuselage; and
a pair of nacelles housing corresponding rotors, which can be tilted together with the corresponding rotors with respect to the corresponding half-wing about a third lateral axis, which is orthogonal to the second longitudinal axis and the first axes of the rotors when the convertiplane is in the helicopter configuration.

Each rotor comprises, in a known manner, a mast rotatable about the corresponding first axis and a plurality of blades hinged on the mast.

In particular, for each rotor, it is possible to identify an imaginary rotor disc, which corresponds to the circumference traced by the free tips of the blades during their rotation.

A convertiplane also comprises, for each rotor, a control system for controlling the collective pitch and cyclic pitch of the blades.

Each aforementioned control system is designed to adjust the modulus and direction of the thrust generated by the rotors.

More specifically, each control system performs two primary functions:
under the action of a flight control known as the "collective pitch", it simultaneously varies the pitch angle of all the blades of the corresponding rotor, so as to adjust the modulus of the thrust generated by that rotor; and
under the action of a flight control known as the "cyclic pitch", it individually and cyclically varies the pitch angle of the blades of the corresponding rotor during their rotation about the mast's rotation axis.

The control system basically comprises, for each rotor:
a non-rotating swashplate, which is angularly fixed with respect to the first axis, is free to translate parallel to the first axis, and is free to oscillate with respect to a fulcrum about the second axis and the third axis; and
a rotating swashplate, which is rotatable about the first axis integrally with the mast, is free to translate parallel to the first axis integrally with the non-rotating swashplate, and is free to oscillate about the aforementioned fulcrum about the second axis and the third axis integrally with the non-rotating swashplate.

The rotating swashplate Is connected to the blades by respective connecting rods arranged in an eccentric position with respect to the longitudinal direction of extension of the blades.

In a known helicopter-derived solution, the convertiplane also comprises, for each rotor:
a first actuator controlled by the "collective pitch" flight control, and operatively connected to the non-rotating swashplate so as to cause its translation along the first axis and consequently vary the collective pitch of the blades of each rotor; and
a pair of second actuators controlled by the "cyclic pitch" flight control, and operationally connected to the non-rotating swashplate so as to cause it to tilt with respect to the fulcrum and about the second and third axes, defining between them an oscillation plane, and consequently vary the cyclic pitch of the blades of each rotor.

Due to the control of the cyclic pitch of the blades and that the swashplate can be tilted in a plane, it is thus possible to tilt the rotor disc in the plane defined by the second axis and the third axis, i.e. longitudinally and laterally with respect to the longitudinal direction of forward movement of the convertiplane.

The tilting of the rotor disc enables controlling the direction of application of the rotor's thrust.

For example, with reference to the helicopter configuration, the tilt of the rotor disc about the second axis of the helicopter determines a component of the rotor's thrust parallel to the first axis and directed forwards and backwards, respectively.

Similarly, the tilt of the rotor disc about the third axis determines a sideways component of the rotor's thrust.

There is awareness in the industry of the need to reduce the overall dimensions necessary for controlling the pitch variation of the blades of each rotor.

To this end, it has been proposed to replace the one of the above-mentioned second actuators with a fixed rod.

In consequence, the rotating and non-rotating swashplates of each rotor and the corresponding rotor disc can only be tilted about a corresponding axis and no longer in a plane.

In other words, it is possible to direct the thrust generated by the rotors only in one direction and no longer in a plane.

The reduced flexibility in manoeuvring the rotor discs is compensated by the fact that the convertiplane comprises a pair of rotors.

For example, manoeuvring the convertiplane sideways to the longitudinal direction takes place by increasing the collective pitch of one of the rotors and reducing the collective pitch of the other of the rotors.

There is awareness in the industry of the need to reduce the overall dimensions necessary for the pitch control system of the blades of the rotors and, at the same time, optimize the tilting of the rotor discs in both the helicopter configuration and the aeroplane configuration.

More specifically, there is awareness in the industry of the need to increase the static sideways stability of the convertiplane and limit the total flapping angle of the blades of the rotors in the helicopter configuration. There is also awareness of the need to increase the static sideways stability of the convertiplane and limit the risk of interference between the blades of the rotors in the maximum flap position and the associated half-wings, with reference to the aeroplane configuration.

U.S. Pat. No. 9,567,070 and US 2007/0221780 describe a known type of convertiplane.

EP-A-2105379 describes a convertiplane.

DISCLOSURE OF INVENTION

The object of the present invention is to produce a convertiplane that enables satisfying at least one of the aforementioned needs in a simple and inexpensive manner.

BRIEF DESCRIPTION OF THE DRAWINGS

For a better understanding of the present invention a preferred embodiment is described hereinafter, purely by way of non-limitative example and with reference to the accompanying drawings, in which.

BEST MODE FOR CARRYING OUT THE INVENTION

Figure 1:
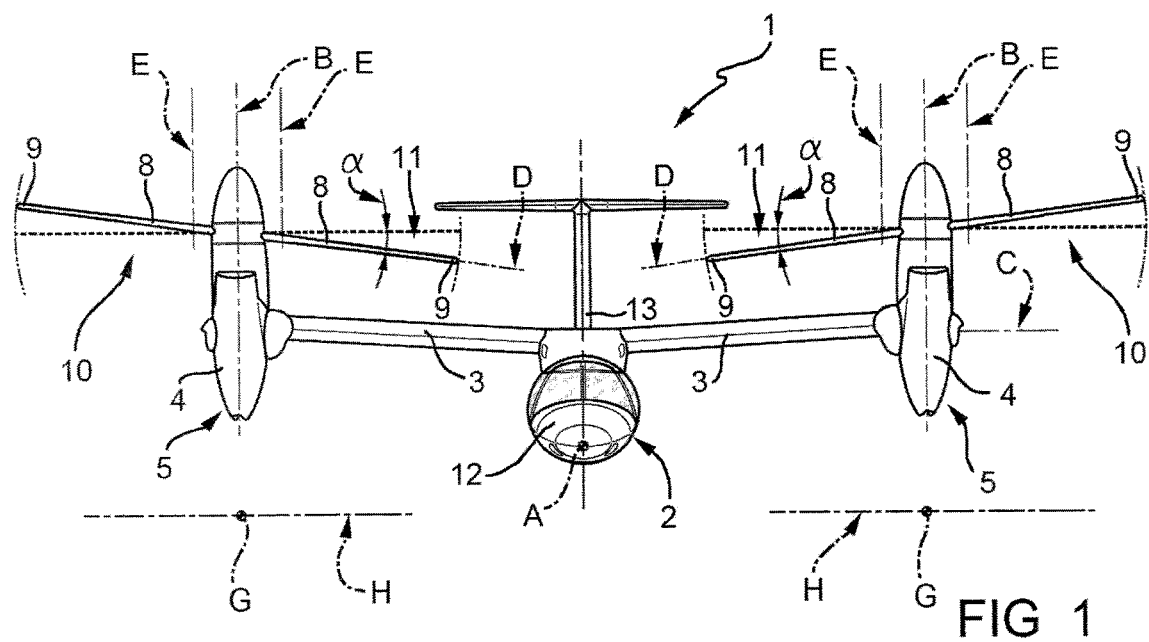
FIG. 1 is a front view of a convertiplane made according to the principles of the present invention and in the helicopter configuration.
Figure 2:
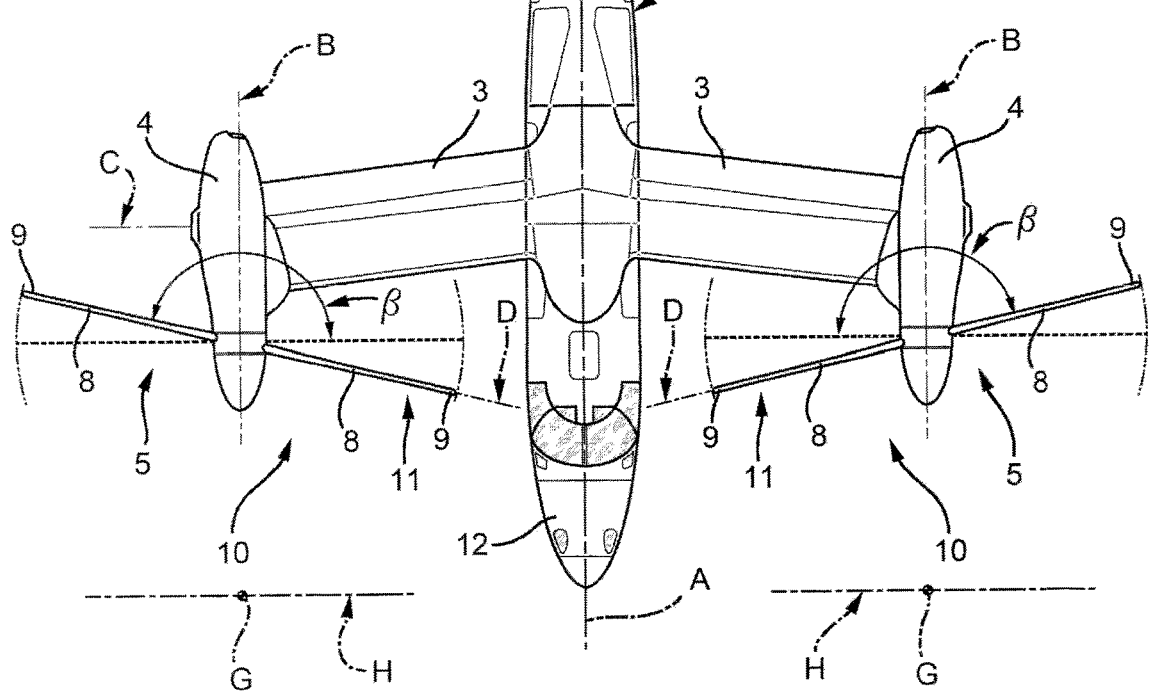
FIG. 2 is a top view of the convertiplane in FIG. 1 in the aeroplane configuration.
Figure 3:
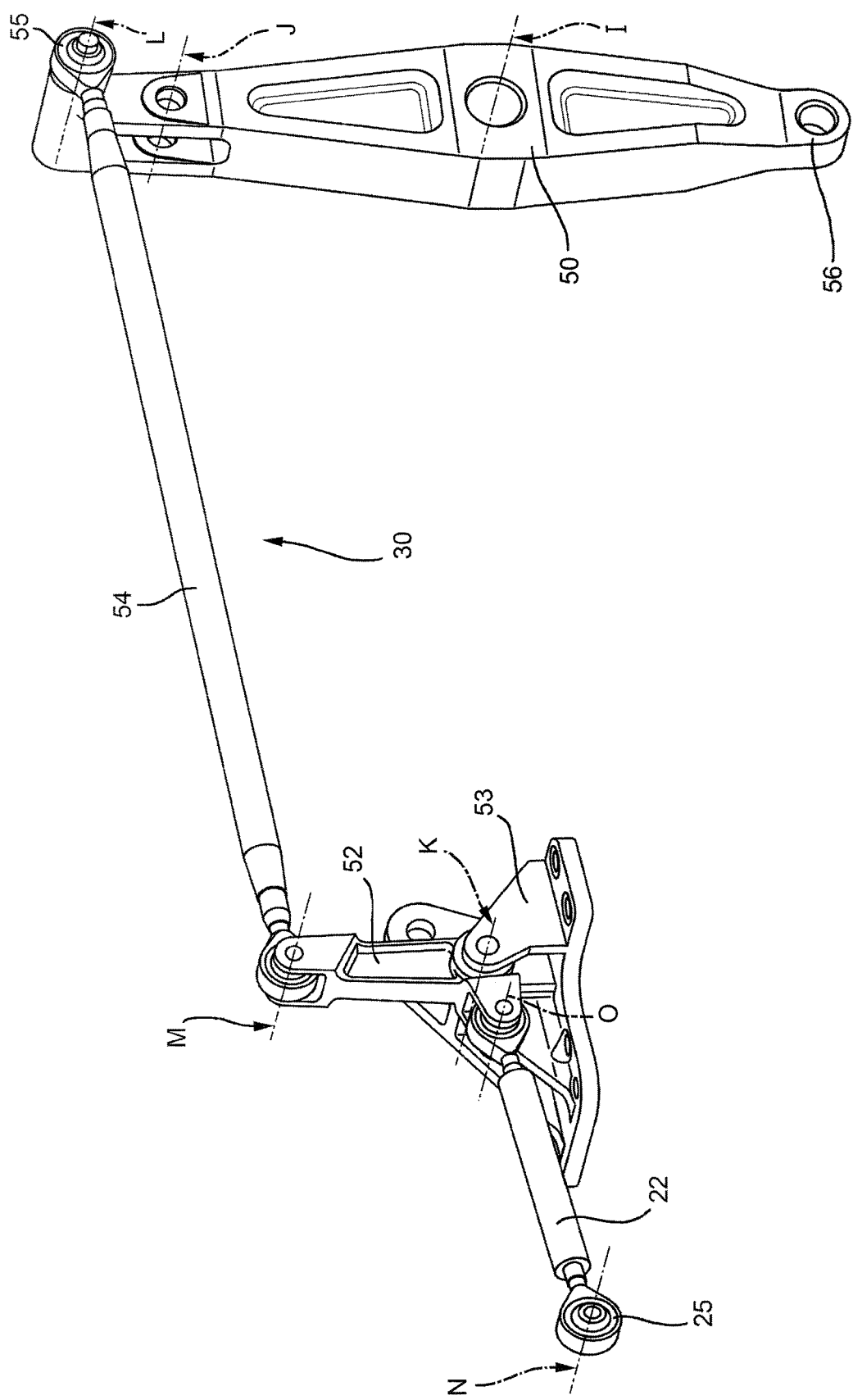
FIG. 3 shows a perspective view, on a highly enlarged scale, of first components of a control system for controlling the pitch of the blades of a rotor of the convertiplane in FIGS. 1 and 2.

Referring to FIGS. 1 and 2, reference numeral 1 indicates a convertiplane.

The convertiplane 1 basically comprises:
a fuselage 2 having a longitudinally extending axis A;
a pair of half-wings 3 extending in a cantilever fashion from respective mutually opposite sides of the fuselage 2 and transversely to axis A; and
a pair of nacelles 4 housing corresponding rotors 5.

The fuselage 2 comprises a nose 12, located at the front, and a tail portion 13, opposite to each other along axis A.

It should be noted that the terms "front", "tail", "longitudinal", "sideways" and similar terms used in this description refer to a normal direction of forward movement of the convertiplane 1 in translational flight, shown in FIGS. 1 and 2.

In greater detail, each rotor 5 basically comprises:
an engine, which is not shown;
a mast 6 rotatable about an axis B;
a hub 7 driven in rotation by the mast 6; and
a plurality of blades 8 (only two of which are shown in FIGS. 1 and 2) hinged on the hub 7.

The nacelles 4 can be tilted integrally with the rotors about an axis C relative to the half-wings 3.

Axis C is transversal to axis A and axes B.

The convertiplane 1 can be selectively arranged:
in a "helicopter" configuration (visible in FIG. 1), wherein the axes B of the rotors 5 are orthogonal to axis A and to axis C; and
in an "aeroplane" configuration (visible in FIG. 2), wherein the axes B of the rotors 5 are parallel to axis A and orthogonal to axis C.

As the rotors 5 are identical to each other, reference will be made hereinafter to a single rotor 5.

The blades 8 extend along respective axes D and comprise respective free tips 9.

During their rotation, the free tips 9 of the blades 8 of the rotor 5 trace an imaginary circumference indicated hereinafter in this description as the rotor disc 10.

With particular reference to the aeroplane configuration shown in FIG. 2, the rotor disc 10 comprises a half-disc 11 arranged on the side near the fuselage 2 and facing an end portion of the half-wing 3 along a direction parallel to axis A.

Each blade 8 is mounted on the respective hub 7 so as to be able to:
vary its pitch angle, i.e. the angle defined with respect to a fixed direction coincident with axis D; and
vary its flapping angle, i.e. the angle defined with respect to an axis E orthogonal to axes B and D.

The convertiplane also comprises:
a flight control 15 (only schematically shown) known as the collective pitch, which is operated to set a desired collective pitch value of the blades 8;
a flight control 16 (only schematically shown) known as the cyclic pitch, which is operated to set a desired cyclic pitch value of the blades 8; and
a control system 30 for controlling the pitch of the blades 8, which is interposed between the aforementioned flight controls 15 and 16 and the blades 8 to vary the cyclic and collective pitches of the blades 8.

More specifically, a change in collective pitch causes a simultaneous change in the pitch angle of all the blades 8, so as to vary the modulus of the thrust generated by the corresponding rotor 5.

A change in cyclic pitch causes a cyclic change in the pitch angle of each blade 8 during its rotation about axis B, between a maximum value and a minimum value.

In this way, the flight control 16 causes a change in the tilt of the rotor disc 10 and the generation of a thrust component orthogonal to axis B of the rotor 5.

Figure 7:
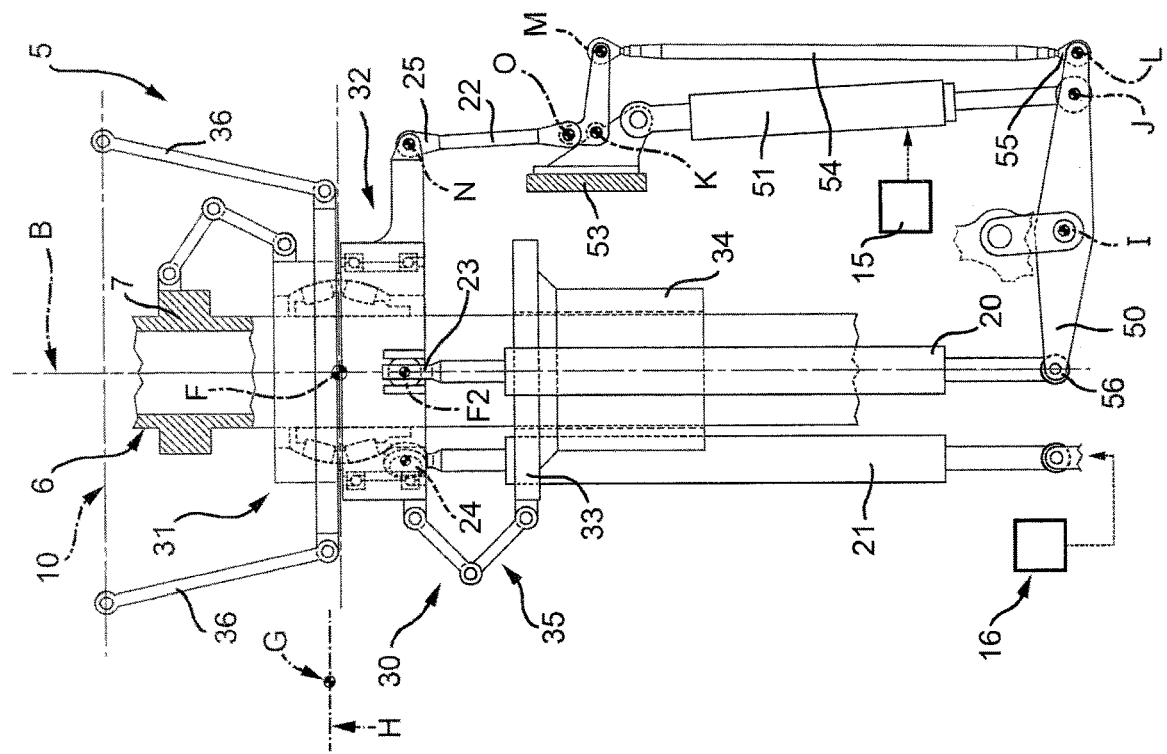
FIGS. 7 to 9 show the control system in FIGS. 4 to 6 in respective operating positions.
Figure 7:
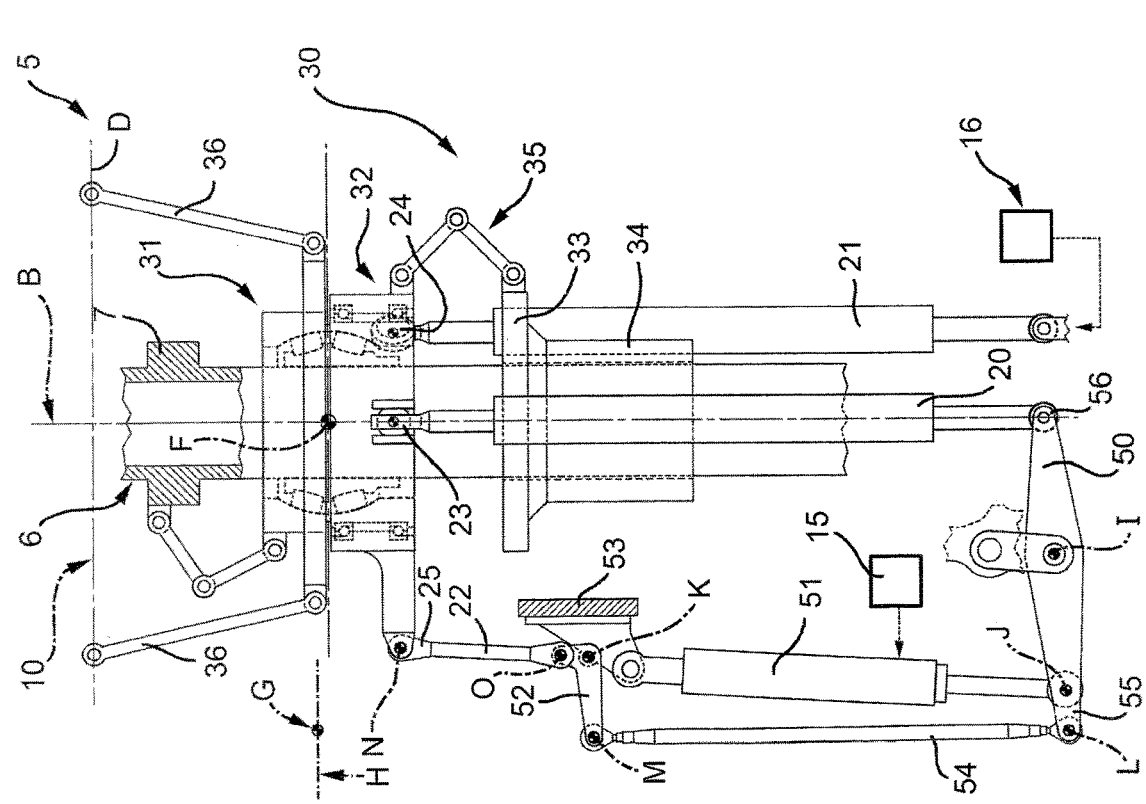
Figure 8:
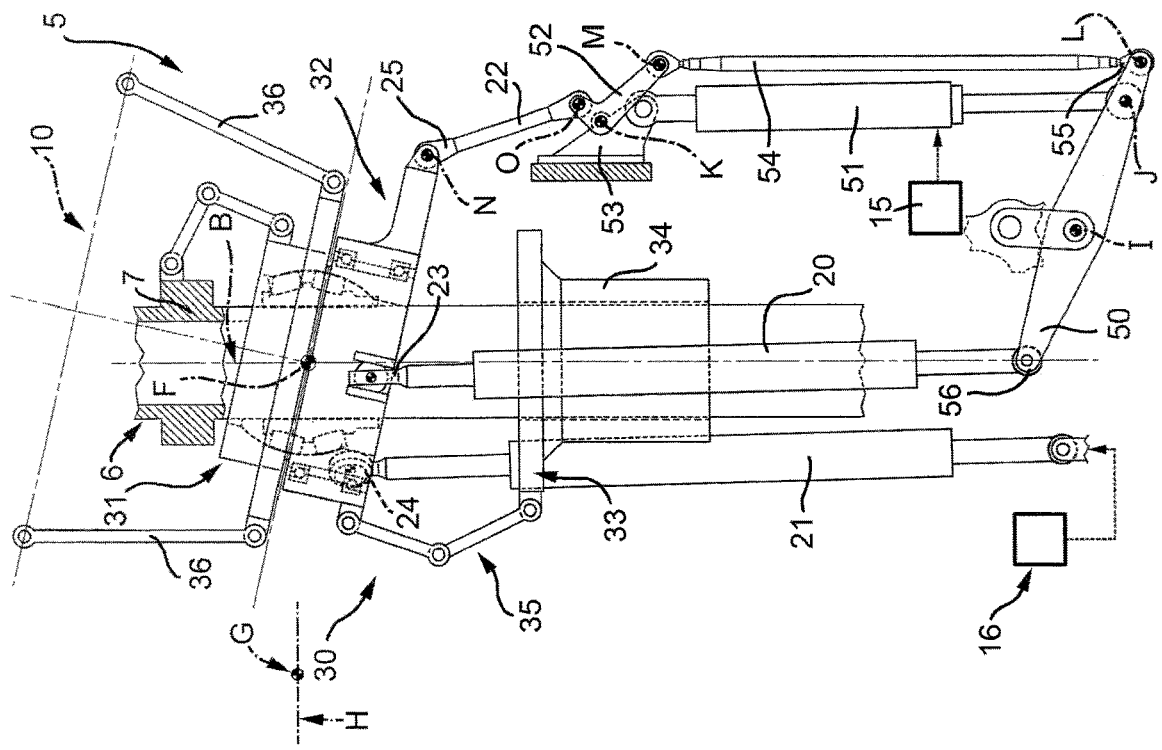
Figure 8:
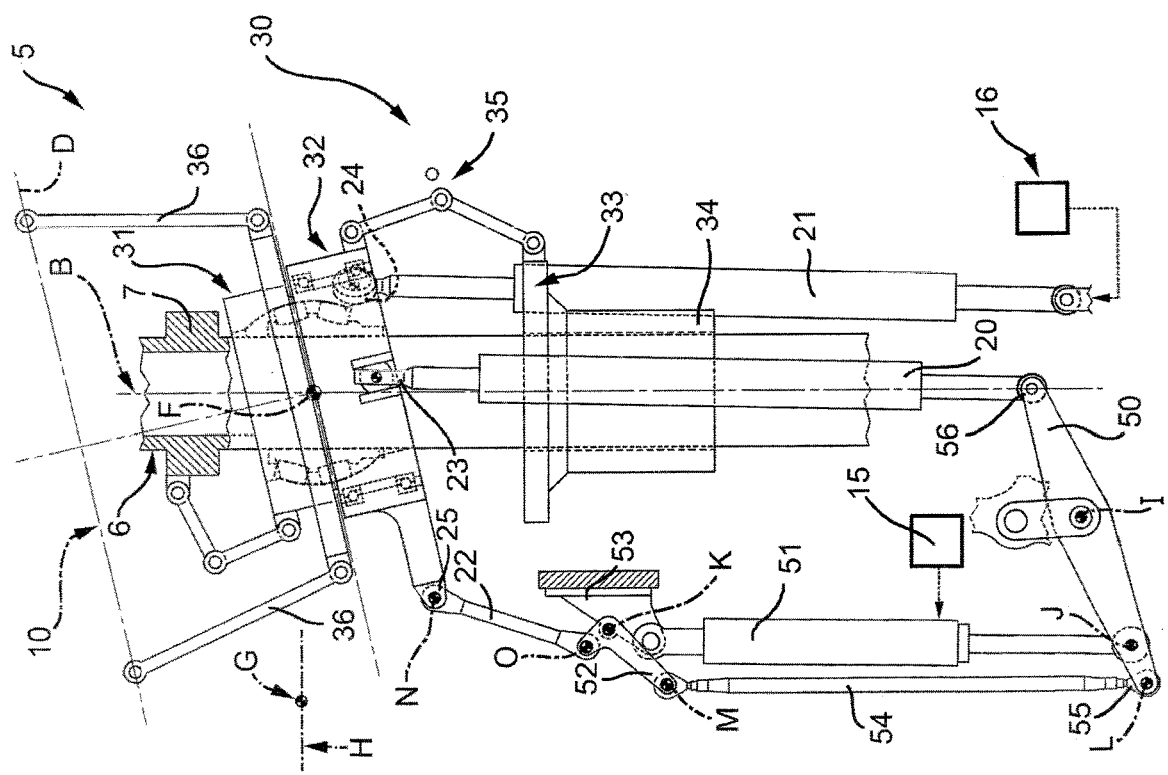
Figure 9:
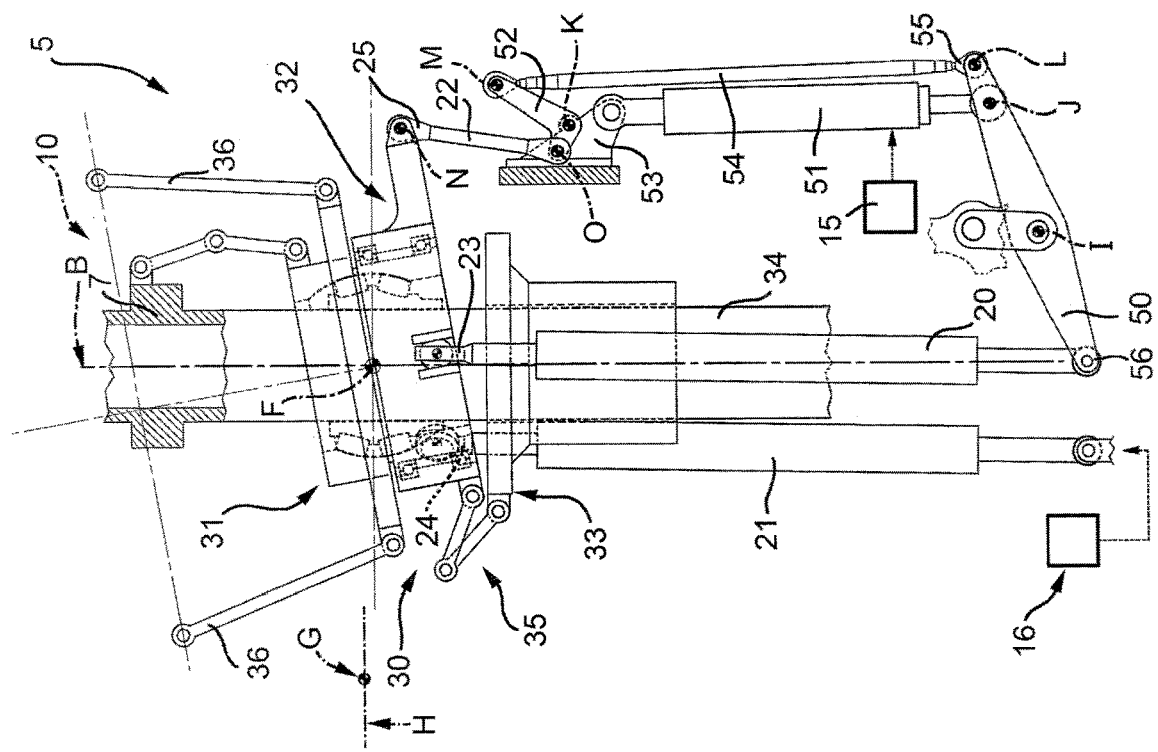
Figure 9:
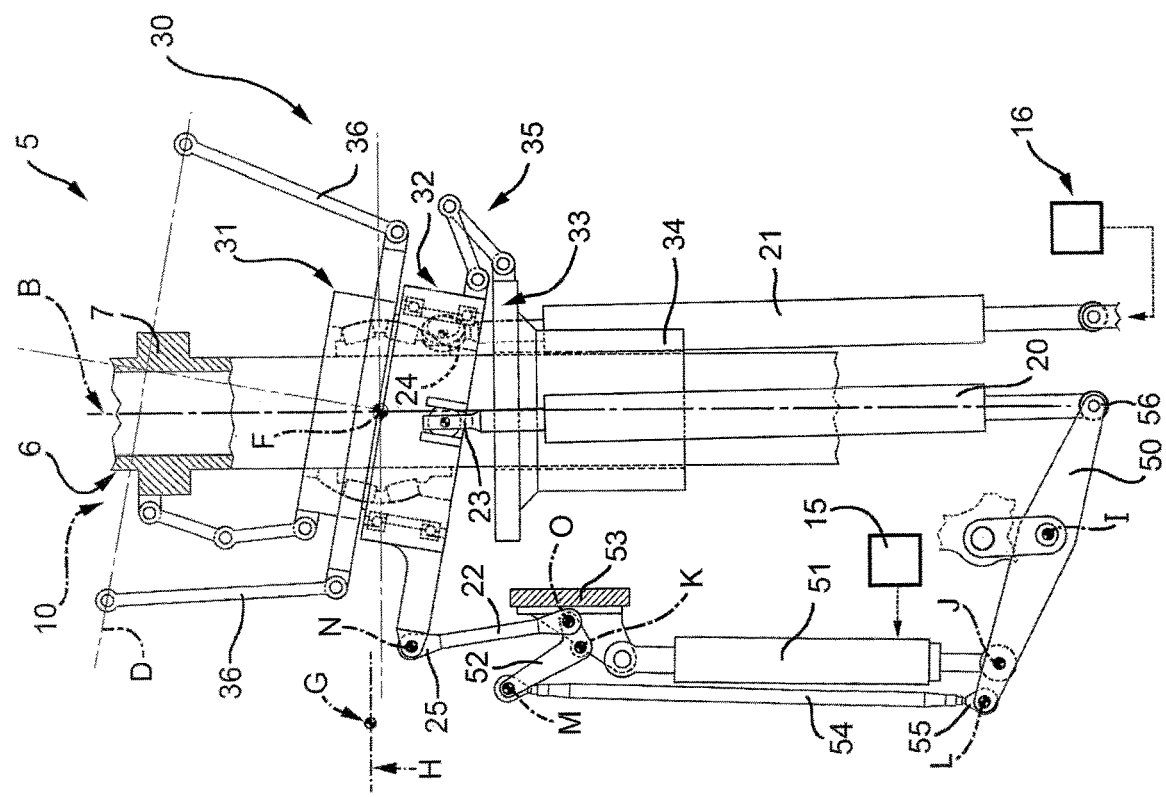

Referring to FIGS. 7 to 9, the control system 30 of each rotor 5 basically comprises:
a rotating swashplate 31, connected to the hub 7 by means of a compass linkage 35 so as to rotate about axis B integrally with the mast 6 and the blades 8, slide along axis B, and be free to oscillate about a fulcrum F lying on axis B; and a non-rotating swashplate 32, rotationally fixed about axis B, sliding along axis B, and free to oscillate about the aforementioned fulcrum F.

The swashplates 31 and 32 can slide along axis B integrally with one another and can be tilted about the fulcrum F integrally with one another.

In particular, a stator 34 supporting the mast 6 passes through the swashplate 32 and the mast 6 passes through swashplate 31.

The control system 30 also comprises a disc 33 connected to the stator 34 of the mast 6 in a fixed manner by means of a compass linkage 35 and connected to swashplate 32 so as to prevent rotation of the swashplate 32 about axis B as a consequence of rotation of the swashplate 31.

The fulcrum F allows oscillation of the swashplates 31 and 32 of each rotor about two mutually orthogonal axes G and H.

In consequence, the rotor disc 10 of each rotor 5 is free to tilt about axes G and H, mutually orthogonal and orthogonal to axis B.

In the case shown in the helicopter configuration in FIG. 1, axes G are parallel to axis A and orthogonal to axis C, and axes H are parallel to axis C.

In the aeroplane configuration in FIG. 2, axes G are orthogonal to axis A and to axis C, and axes H are parallel to axis C.

Each rotor 5 also comprises:

an actuator 21 controlled by the corresponding flight control 16 by means of a linkage (not shown) and operatively connected to the corresponding control system 30, so as to vary the cyclic pitch of the blades 8 and so tilt the rotor disc about axis G; and a rod 20 controlled by the corresponding flight control 15 and operatively connected to the control system 30, so as to vary the collective pitch of the blades 8 of the rotor 5.

The rod 20 and the actuator 21 have respective free ends 23 and 24 fixed to the swashplate 32.

The end 23 is fixed to swashplate 32 coaxially to axis B. In this way, movement of the rod 20 parallel to axis B causes translation of swashplate 32, and therefore of the swashplate 31, parallel to axis B.

The end 24 is fixed to swashplate 32 in an eccentric position with respect to axis B. In this way, movement of the rod 20 parallel to axis B causes tilting of the swashplates 31 and 32 about axis G.

The rotor 5 also comprises a plurality of connecting rods 36 interposed between swashplate 32 and the respective blades 8 in an eccentric position with respect to the corresponding axes D.

In this way, translation of the swashplates 31 and 32 parallel to axis B causes a change in the collective pitch of the blades 8, while tilting the swashplates 31 and 32 causes a change in the cyclic pitch of the blades 8 and consequently the tilt of the rotor disc 10 about axis G.

Advantageously, the rotor 5 comprises a rod 22 operatively connected to swashplate 32 and movable to cause the tilting of the rotor disc 10 about axis H by an angle α or β associated with the configuration of the convertiplane 1.

In summary, through the actuator 21 and rod 22, the rotor disc 10 can be tilted by a selectively variable angle in the direction of forward movement parallel to axis A of the convertiplane 1 and tilted by a predetermined angle in the lateral direction parallel to axis C of the convertiplane 1, in the helicopter configuration of the convertiplane 1.

The rotor disc 10 can also be tilted by a selectively variable angle in the lateral direction of the convertiplane 1 and by a predetermined angle in the direction of forward movement of the convertiplane 1 in the aeroplane configuration of the convertiplane 1.

Figure 4:
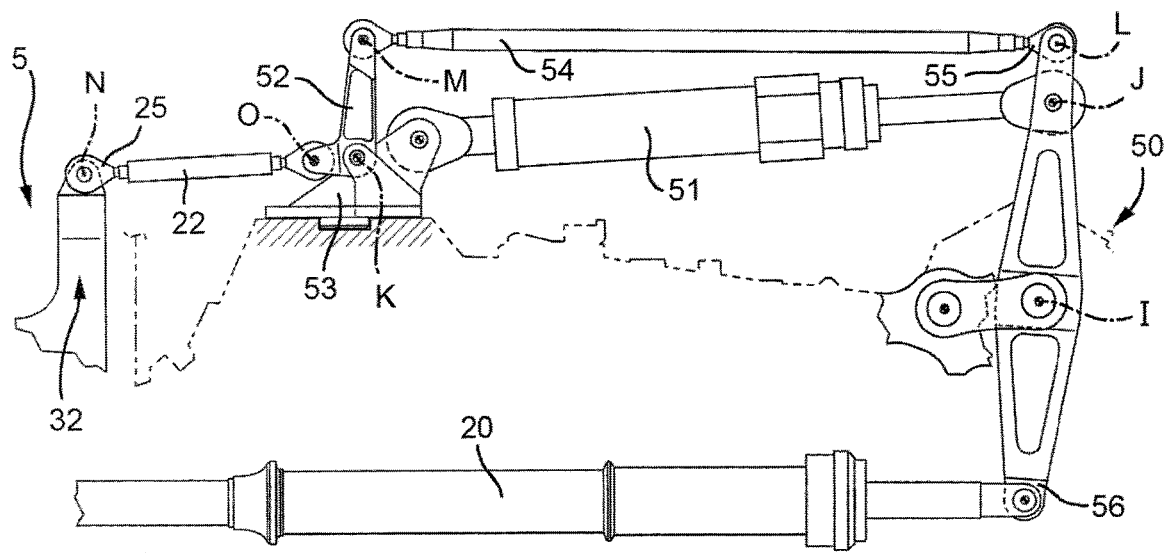
FIGS. 4 to 6 shows the first components and further components of the control system in FIG. 3 in respective operating positions, with parts removed for the sake of clarity.
Figure 5:
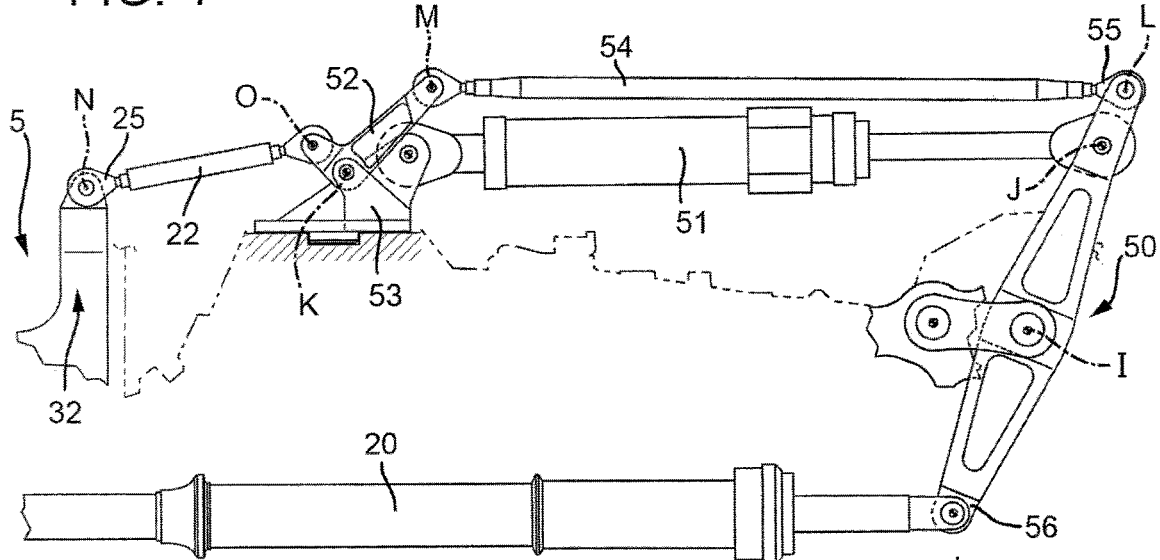

In greater detail, the rod 22 is movable between a first position (FIGS. 5 and 8) and a second position (FIGS. 4 and 7) when the convertiplane 1 is in the helicopter configuration.

Figure 6:
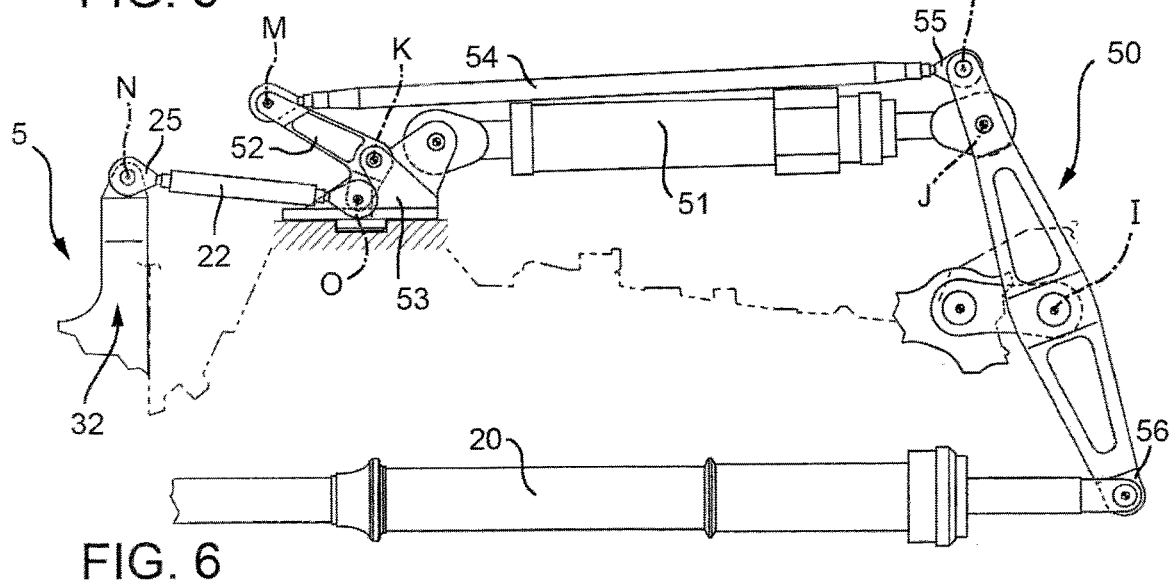

The rod 22 is movable between the second position and the third position (FIGS. 6 and 9) when the convertiplane 1 is in transition from the helicopter configuration to the aeroplane configuration and when the convertiplane 1 is in the aeroplane configuration.

In consequence, the tilt of the rotor disc 10 with respect to axis H (FIG. 1) is adjustable when the convertiplane 1 is in the helicopter configuration.

Similarly, the tilt of the rotor disc 10 with respect to axis H is adjustable when the convertiplane 1 is in transition from the helicopter configuration to the aeroplane configuration and when the convertiplane 1 is in the aeroplane configuration (FIG. 2).

More specifically, referring to helicopter configuration in FIG. 1, the first and second positions taken by rods 22 are such that the rotor discs 10 converge towards the fuselage 2.

Referring to the aeroplane configuration in FIG. 2, the third and fourth positions taken by rods 22 are such that the rotor discs 10 converge towards the nose 12 of the fuselage 2.

In particular, the blades 8 defining the half-discs 11 at given instant in time extend at increasing distances from the corresponding half-wings 3, when proceeding from the respective axes B towards the corresponding tips 9, in the aeroplane configuration of the convertiplane 1 (FIG. 2).

Alternatively, the third positions taken by rods 22 are such that the rotor discs 10 are orthogonal to axis A and to the corresponding axes B, in the aeroplane configuration of the convertiplane 1.

As described hereinafter in this description, the movement of rod 22 is controlled by flight control 15.

In greater detail, flight control 15 moves rod 20 between:

a corresponding first position (FIGS. 5 and 8), in which the collective pitch of the blades 8 takes a first minimum value;

a corresponding second position (FIGS. 4 and 7), in which the collective pitch of the blades 8 takes a second value; and a corresponding third position (FIGS. 6 and 9), in which the collective pitch of the blades 8 takes a third maximum value.

Movement of the rod 20 between the corresponding first and second positions corresponds to a range of collective pitch values characteristic of the helicopter configuration.

Movement of the rod 20 between the corresponding second and third positions corresponds to a range of collective pitch values characteristic of the aeroplane configuration of the convertiplane 1.

In particular, the movement of the rod 20 towards the corresponding positions associated with an increase in collective pitch value causes an increase of the angle α and β of the rotor disc 10 with respect to axis H in the helicopter configuration and in the aeroplane configuration of the convertiplane 1.

In particular, the angles α and β of the rotor disc 10 with respect to axis H are different from one another.

The rotor disc 10 is also subjected to reversal about axis H during transformation between the helicopter and aeroplane configurations.

In particular, the half-disc 11 closest to the half-wing 3 along axis B in the helicopter configuration becomes the half-disc 11 furthest away from the half-wing 3 along axis A in the aeroplane configuration, and vice versa.

Referring to FIGS. 3 to 9, the rod 22 has a free end 25 fixed to swashplate 32.

In particular, similarly to end 24, end 25 is fixed to the swashplate 32 in an eccentric position with respect to axis B. in this way, movement of rod 22 parallel to axis B causes tilting of the swashplates and 32 about the fulcrum F.

With particular reference to FIGS. 4 to 9, the rotor 5 also comprises:

a rocker arm 50 hinged about an axis I;

an output member 51 controlled by the flight control 15 and hinged to the rocker arm 50 in an eccentric position with respect to axis J;

a lever 52 hinged to a bracket 53 about an axis K; and a connecting rod 54 hinged, at its opposite ends between an end 55 of the rocker arm 50 and the lever 52 about respective axes L and M.

The rod 22 is hinged to swashplate 32 at its end 25 and about an axis N and to the lever 52 about an axis O, distinct from axes J and L.

In the case shown, the output member 51 is interposed between axis I and the connecting rod 54.

The rod 20 is hinged, at its opposite ends, to swashplate 32 at end 23 and to an end 56 of the rocker arm 50 opposite to end 55 with respect to axis I.

In the case shown, axes I, J, K, L, M, N and O are parallel to each other and to axis G and orthogonal to axis B.

In the case shown, the lever 52 is L-shaped.

The operation of the convertiplane 1 is described below in detail, starting from the helicopter configuration of the convertiplane 1 shown in FIG. 1.

In this condition, the axes B of the rotors 5 are orthogonal to axis A and to axis C.

Flight controls 15 set collective pitch values for the blades 8 of the rotors 5, ranging between the respective first minimum values and the respective second values, according to the operational needs of the convertiplane 1.

Flight controls 15 also set, via the control system 30, the tilt of the rotor discs 10 about the corresponding axes H, based on the collective pitch value set for the blades 8 of the rotors 5.

More specifically, the rotor discs 10 are tilted about the corresponding axes H so as to be convergent towards the fuselage 2, when the collective pitch values for the blades 8 of the rotors 5 range between the respective first minimum values and the respective second values. In the case where it is necessary to move the helicopter 1 parallel to axes G, i.e. laterally to axis A, it is sufficient to increase the collective pitch of one of the rotors 5 and/or decrease the collective pitch of the other rotor 5.

Flight controls 16 set, via the control system 30, the tilt of the rotor discs 10 about axes G parallel to axis A, i.e. they tilt the rotor discs 10 towards the nose 12 or towards the tail portion 13 of the fuselage 2 according to the operational needs of the convertiplane 1. For example, in the case where it is necessary to propel the convertiplane 1 forwards along axis A, the rotor discs 10 are tilted towards the nose 12. In the case where it is necessary to make the convertiplane 1 go backwards, the rotor disc is tilted towards the tail portion 13.

In particular (FIGS. 4 to 9), following operation of flight controls 15, the output members 51 cause rotation of the rocker arms 50 about the corresponding axes I.

This rotation of the rocker arms 50 causes, for each rotor 5, translation of the corresponding rods 20 connected to the corresponding swashplate 32 and movement of the corresponding connecting rod 54 hinged to the corresponding axes L and M.

The translations of the rods 20 cause translation of swashplates 32, and thus of the corresponding swashplates 31 and connecting rods 36, parallel to the axes B. In this way, the blades 8 simultaneously change their pitch angles by the same amount.

At the same time, movement of the corresponding connecting rods 54 causes rotation of the corresponding levers 52 about the corresponding axes K and consequent movements of the corresponding rods 22 with the corresponding components parallel to the respective axes B. These movements of rods 22 cause the tilting of the swashplates 31 and 32 about the fulcrum F and about axis G.

At the same time, operation of flight controls 16 causes movement of the actuators 21 and the consequent tilting of the swashplates 31 and 32 about fulcrum F.

Since the swashplates 32 rotate, the corresponding connecting rods 36 are cyclically raised and lowered while they turn, causing cyclic variation in the pitch angles of the blades 8 during rotation of the blades 8 about the corresponding axes B.

In this way, through rods 22 and the actuators 21, the rotor discs 10 tilt about the corresponding axes H laterally to axis A, become arranged converging towards axis A by an angle determined by the collective pitch set by flight control 15, and they tilt about the corresponding axes G parallel to axis A by an angle determined by flight controls 16.

In the case where it is necessary to operate the convertiplane 1 in the aeroplane configuration, the rotors 5 are rotated 90 degrees about axis O towards the nose 12 of the fuselage 2. At the end of this rotation, axes B are parallel to axis A and orthogonal to axis O (FIG. 2).

During the transition to the aeroplane configuration (FIGS. 5 and 7) and when the convertiplane 1 is arranged in the aeroplane configuration (FIGS. 6 and 9), flight controls 15 set, by means of rod 20 and the swashplates 31 and 32, collective pitch values for the blades 8 of the rotors 5, ranging between the respective second values and the respective third values, according to the propulsion requested from the convertiplane 1.

In the aeroplane configuration, the blades 8 of the half-discs 11 that in a given instant of time extend from axis B towards the fuselage 2 are facing the corresponding half-wings 3 along axis A.

During the aforementioned transition, the rotor disc 10 is also subjected to reversal about axis H, during transformation between the helicopter and aeroplane configurations.

In this way, the half-disc 11 closest to the half-wing 3 along axis B in the helicopter configuration become the half-disc 11 furthest away from the half-wing 3 along axis A in the helicopter configuration.

Flight controls 15 arrange, by means of the rocker arms 50, connecting rods 54, connecting rods 52, rods 22 and systems 30, the rotor discs 10 in a position converging towards the nose 12 of the fuselage 2, based on the collective pitch set for the blades 8 of the rotors 5.

In the case where it is necessary to increase the propulsion of the rotors 5, to increase the cruising speed of the convertiplane 1 for example, it is sufficient to raise the collective pitch of the blades 8 via flight controls 15 and the corresponding rods 20. This increase in collective pitch, up to the maximum third value, also causes an increase in the tilt angle β of the rotor discs 10 with respect to the corresponding axes H.

Flight controls 16 cause, by means of the corresponding actuators 21 and systems 30, the tilting of the rotor discs 10 about the corresponding axes G, arranged parallel to axis A in the aeroplane configuration of the convertiplane 1.

Alternatively, flight controls 15 arrange the rotor discs 10 in a position orthogonal to axis A in the aeroplane configuration, in an entirely similar manner to that already described above.

From examination of the characteristics of the convertiplane 1 and the method according to the present invention, the advantages achievable therewith are evident.

In greater detail, the rods 22 of the rotors 5 enable varying the tilt of the rotor discs 10 about the corresponding axes H, according to the aeroplane or helicopter configuration assumed by the convertiplane 1.

In this way, it is possible to reduce the overall dimensions and constructional complexity of the systems 30, at the same time optimizing the tilting of the rotor discs 10 both in the helicopter configuration and in the aeroplane configuration.

In fact, on the one hand, the convertiplane 1 requires, for each rotor 5, just one actuator defined by the control member 51 and just one actuator 21, instead of three distinct actuators as in the solutions traditionally used in the helicopter field and described in the introductory part of this description.

On the other hand, rods 22 cause oscillation of the swashplates 31 and 32 about the corresponding axes H so as to:

arrange the rotor discs 10 converging towards the fuselage 2 in the helicopter configuration (FIG. 1); and arrange the rotor discs 10 converging towards the nose 12 of the fuselage 2 in the aeroplane configuration (FIG. 2).

Thanks to this, the applicant has noted that the following advantages can be achieved.

Referring to the helicopter configuration, the arrangement of the rotor discs 10 converging towards the fuselage 2 enables:

limiting lateral flapping of the blades 8 in forward flight, so as to raise the maximum forward speed of the convertiplane 1 in the helicopter configuration 1 within which it is possible to contain the overall flapping of the blades 8 of the rotors 5; and raising the lateral stability of the convertiplane 1 in the case of sideslip or banking of the convertiplane 1 in the case of angular banking about axis A; in fact, in these circumstances, the rotors 5 generate a stabilizing rolling moment entirely similar to that obtained in a conventional aeroplane through the use of half-wings with a positive dihedral.

Referring to aeroplane configuration, the arrangement of the rotor discs 10 converging towards the nose 12 of the fuselage 2 enables:

increasing the distance along axis A between the blades 8 of the rotors 5 and the half-wings 3, increasing the safety margin in the event of crosswind, which generates flapping of the blades 8 about the corresponding axes H that tends to move the blades 8 nearer the respective half-wings 3; and generating a stabilizing yaw moment with respect to the barycentre of the convertiplane 1 in the presence of crosswind, so as to realign axis A of the convertiplane 1 with the wind direction.

In summary, the convertiplane 1 enables combining the advantages of solution simplification with just control member 51 and actuator 21 with the possibility of optimizing the tilting of the rotor discs 10 about axes H, according to the helicopter or aeroplane configuration of the convertiplane 1.

Furthermore, the movement of rods 22 is determined by the flight controls 15 intended to control the collective pitch of the blades 8 of the rotors 5.

In this way, it is possible to exploit the fact that the collective pitch of the blades 8 varies in a first range of values in the helicopter configuration and in a second range of values in the aeroplane configuration of the convertiplane 1.

Finally, the tilt angles of the rotor discs 10 about the corresponding axes H gradually increase as the collective pitch of the blades 8 increases, with particular reference to the transition from the helicopter configuration to the aeroplane configuration of the convertiplane 1 and to the aeroplane configuration of the convertiplane 1.

In this way, the increase in the cruising speed of the convertiplane 1 in the aeroplane configuration achieved through the increase in collective pitch of the blades 8 of the rotors 5 automatically causes an increase in the aforesaid stabilizing safety margins.

Finally, it is clear that modifications and variants can be made regarding the convertiplane 1 and the associated control method describe and illustrated herein without departing from the scope defined by the claims.

In particular, rods 22 could be operationally connected to the actuators that cause the rotation of the nacelles 4 during the transition between the helicopter configuration and the aeroplane configuration.

The invention claimed is:

1. A convertiplane (1) comprising:
a fuselage (2) having a first longitudinal axis (A);
a pair of half-wings (3); and
a pair of rotors (5) arranged on respective mutually opposite ends of said half-wings (3);
each said rotor (5) comprising a mast (6) rotatable about a second axis (B) and a plurality of blades (8) hinged on said mast (6) with respect to said second axis (B);
said mast (6) of each said rotor (5) being tiltable integrally with said second axis (B) about a third axis (C) transversal to said second axis (B) and with respect to said fuselage (2) so as to transform said convertiplane (1) between a helicopter configuration and an aeroplane configuration of said convertiplane (1);
each said second axis (B) being, in use, transversal to said first axis (A) of said convertiplane (1) in said helicopter configuration and being, in use, substantially parallel to said first axis (A) in said aeroplane configuration;
each said rotor (5) being associated with a respective imaginary rotor disc (10), which is defined by the imaginary circumference described, in use, by the rotation of the free tips (9) of said blades (8) opposite to the respective said second axis (B);
said rotor disc (10) being tiltable about a fourth axis (G) transversal to said second axis (B);
each said rotor (5) further comprising control means (30) for controlling the cyclic pitch and collective pitch of the corresponding said blades (8);
said control means (30) comprising, in turn, for each said rotor (5):
a first actuator (51, 20) controllable to alter said collective pitch of the corresponding said blades (8); and
a second actuator (21) controllable to alter the tilt of the corresponding said rotor disc (10) about said fourth axis (G);
characterized in that said control means (30) comprise, for each said rotor (5), a rod (22) movable to alter the tilt angle ($\alpha$, $\beta$) of the corresponding said rotor disc (10)

about a fifth axis (H) transversal to said corresponding fourth axis (G) and to said second axis (B);

said rod (22) being movable according to the helicopter or airplane configuration of said convertiplane (1), so as to control said tilt angle (α, β) according to said helicopter or airplane configuration of said convertiplane (1);

said convertiplane (1) comprising, for each said rotor (5), a control member (15) operatively connected to the corresponding said first actuator (51, 20) and to the corresponding said rod (22), and selectively operable to alter said collective pitch of said corresponding said blades (8);

each said control member (15) being movable:

between a first and a second position, with which are associated respective first and second values of said collective pitch of said blades (8) characteristic of said helicopter configuration; and between said second and a third position, with which are associated respective second and third values of said collective pitch of said blades (8) characteristic of the transition from said helicopter configuration to said aeroplane configuration and of said aeroplane configuration;

said rod (22) and control means (30) of each rotor (5) being configured in such a way that the movement of said control member (15) between the corresponding said second and third positions causes a reversal of said tilt of the corresponding rotor disc (10) with respect to and about said fifth axis (H).

2. A method for controlling a convertiplane (1), said convertiplane (1) comprising:

a fuselage (2) having a first longitudinal axis (A);
a pair of half-wings (3); and
a pair of rotors (5) arranged on respective mutually opposite ends of said half-wings (3);

each said rotor (5) comprising a mast (6) rotating about a second axis (B) and a plurality of blades (8) hinged on said mast (6) with respect to said second axis (B);

said method comprising the steps of:

i) driving said mast (6) of each said rotor (5) in rotation about the corresponding second axis (B);

ii) tilting each said rotor (5) integrally with the corresponding said second axis (B) about a third axis (C) transversal with respect to said second axis (B) and with respect to said fuselage (2), between a helicopter configuration and an aeroplane configuration of said convertiplane (1);

iii) arranging said second axis (B) transversally to said first axis (A) in said helicopter configuration of said convertiplane;

iv) arranging said second axis (B) parallel to said first axis (A) in said aeroplane configuration of said convertiplane (1);

v) tilting the rotor discs (10) of each said rotor (5) about the corresponding fourth axes (G) transversal to said second axes (B); each said rotor disc (10) being defined, for the corresponding said rotor (5), by the imaginary circumference traced by the free tips (9) of the corresponding said blades (8) opposite to the respective said second axis (B) during their rotation about said second axis (B);

vi) controlling the cyclic and collective pitch of said blades (8) of each said rotor (5);

said step vi) comprising, for each said rotor (5), the steps of:

vii) varying the collective pitch of said blades (8) by means of a first actuator (51, 20);

viii) varying the tilt of the corresponding said rotor disc (10) about said fourth axis (G) by means of a second actuator (21);

characterized in that said step vi) comprises the step ix) of moving a rod (22) to vary the tilt angle (α, β) of the corresponding said rotor disc (10) about a fifth axis (H) transversal to said corresponding fourth axis (G) and to the corresponding said second axis (B), according to said aeroplane or helicopter configuration of said convertiplane (1), so as to control said tilt angle (α, β) of said rotor disc (10) according to said aeroplane or helicopter configuration of said convertiplane (1);

said method further comprising the step x) of arranging said rotor discs (10) in a first configuration where they converge towards said fuselage (2) when said convertiplane (1) is in said helicopter configuration;

said method further comprising, when said convertiplane (1) is in said aeroplane configuration, the steps of:

xi) arranging said rotor discs (10) in a second configuration where they converge towards a nose (12) of said fuselage (2); or xii) arranging said rotor discs (10) in a second configuration where they are orthogonal to said first axis (A); and said method further comprising the steps of:

xiii) of varying the tilt angle (α, β) of the corresponding said rotor disc (10) about said fifth axis (H), according to the collective pitch value of said blades (8) of the corresponding rotor (5); and xiv) of reversing the tilt of the corresponding said rotor disc (10) about said fifth axis (H), when said convertiplane (1) transforms between the helicopter and aeroplane configurations.

3. The method according to claim 2, characterized in that it comprises the step xv) of increasing said tilt angle (α, β) of said rotor disc (10) following an increase in said value of said collective pitch of said blades (8) of the corresponding said rotor (5).

4. The method according to claim characterized in that it comprises the step xv) of varying the tilt angle (α, β) of the corresponding said rotor disc (10) about said fifth axis (H), according to the value of the tilt angle of the corresponding said rotor (5) about said third axis (C).

* * * * *